United States Patent [19]
Schafenacker, Jr.

[11] 3,823,745
[45] July 16, 1974

[54] FLAME-RESISTANT CONDUIT COVERING

[75] Inventor: Ralph Schafenacker, Jr., Doylestown, Pa.

[73] Assignee: Keller Glove Mfg. Company, Plumsteadville, Pa.

[22] Filed: Nov. 6, 1972

[21] Appl. No.: 303,919

[52] U.S. Cl. ............................. 138/103, 138/125
[51] Int. Cl. ..................................... F16l 11/12
[58] Field of Search ....... 138/125, 103, 110; 66/191

[56] References Cited
UNITED STATES PATENTS
2,062,832  12/1936  Saylor ............................ 138/125
2,752,952  7/1956  Dauphinais ...................... 138/125
2,752,953  7/1956  Schmidt ........................ 138/125 X Primary Examiner—Jerry W. Myracle
Attorney, Agent, or Firm—Seidel, Gonda & Goldhammer

[57] ABSTRACT

A flame-resistant conduit covering knitted from an organic material such as flame-retardant rayon having looped pile on at least one surface thereof is disclosed. The knitted material is free from any finish which releases substantial amounts of toxic gases other than $CO$ or $CO_2$ when subjected to heat, whereby it may be used in place of prior art conduit coverings made from a flame-retardant material such as asbestos.

9 Claims, 3 Drawing Figures

FLAME-RESISTANT CONDUIT COVERING

Heretofore, it has been conventional to encase conduits subjected to high temperatures with a flame-retardant material such as asbestos. The use of asbestos is not recommended due to the health problems involved in the manufacture and use of asbestos.

In accordance with the present invention, there is disclosed a flame-retardant covering for use with conduits to be subjected to high temperatures by way of the liquid or material flowing through the conduit or by way of the environment in which the conduit is located. The covering of the present invention is a flexible layer of knitted organic material which is stretchable in at least one direction, and also may be contracted by hand working, so as to fit odd contours. The knitted material has looped pile on at least one surface thereof, has between 6 and 20 wales per inch, and a weight of between 8 and 40 ounces per square yard. It is highly hygroscopic, and its bulk due to its knit nature permits appreciable absorption of water, adhesives, flameproof paints and/or vapor barrier materials. Its knit nature provides large internal air space, excellent wicking properties, and liquid absorption properties. The material is pervious to water so that a water-soluble adhesive may be absorbed thereby. The material is free from any finish which releases substantial amounts of toxic gases other than CO or $CO_2$ when subjected to heat.

The covering in accordance with the present invention may be applied to a conduit by a longitudinally extending wrapped joint, or it may be helically wound around the conduit, or the covering may be in the form of a seamless cylinder stretched over the conduit. If desired, an aluminum coating may be applied to the surface of the material having the looped pile, with the coating being bonded to the loops.

A surprising and unusual result in connection with the covering of the present invention is that it will not burn when dry at temperatures up to 1000°F., and up to the order of 2000°F. when wet with water, and at the same time will retain its strength. Thus, the covering of the present invention when subjected to a blow torch so as to be cherry red in color, took on a charred appearance on the side of the fabric subjected to the heat whereas the opposite surface has barely any discoloration. When the heat was removed, the charred fabric still had its flexibility and strength. It is believed that the looped pile acts as an insulation and prevents the migration of heat while rapidly dissipating the heat.

The covering of the present invention has substantially more air cells than comparable weights of woven asbestos or other insulating material used for covering conduits subjected to high temperatures. The conduit covering of the present invention is easier and faster to apply to a conduit as compared with sections of asbestos covering or other insulating material utilized heretofore. The covering of the present invention may be washed with alkaline soap and detergents or dry cleaned with organic solvents without affecting the flame-retardant properties of the covering. Asbestos coverings, if washed, degenerate appreciably in terms of physical properties.

The conduit covering of the present invention is particularly adapted for use in areas having a controlled atmosphere such as in nuclear submarines. The fabric covering is free from any conventional fabric finish which releases substantial amounts of toxic gases other than CO or $CO_2$ when subjected to a heat of 600°F. By substantial amounts is meant the evolution of more than 1.0 weight percent gas based on the weight of the fabric at 600°F. for 30 minutes. Thus, the conduit covering does not contain any chemicals which release chlorine or chemicals which release odors such as ammonia when subjected to heat. While the fabric covering does release CO and $CO_2$ when subjected to heat, these gases may be controlled by known means. The conduit covering of the present invention may be painted for identification purposes or cleanliness or liquid vapor barrier applications to protect the primary insulation, and can be dyed to any desired color. The covering of the present invention can absorb any moisture on the conduit due to sweating of the conduit.

The conduit covering of the present invention is preferably knitted on a circular open head sinker machine having latched needles which pull the yarn down between sinkers. The covering may be knit from 100 percent rayon as made in accordance with U.S. Pat. No. 3,455,713. The disclosure in said patent is incorporated herein by reference. Alternatively, the covering may be knit from rayon with ends blended with cotton or fiberglass. Alternatively, the covering may be knit from 100 percent cotton. If knitted with 100 percent cotton, the exposed surface should be a permanent flame-retardant surface.

It is an object of the present invention to provide a novel conduit covering in the form of a permanent flame-retardant knitted material.

It is another object of the present invention to provide a conduit covering which is stretchable in at least one direction and may be contracted by hand working so as to fit odd contours, and having a permanent flame-retardant surface.

It is another object of the present invention to provide a permanent flame-retardant covering for conduits which is easy to install, and free from any finish which releases substantial amounts of toxic gases other than CO or $CO_2$ when subjected to heat.

It is another object of the present invention to provide a permanent flame-retardant knitted fabric covering for conduits which may be applied to the conduit in a variety of different manners, as by sewing, adhesives, tapes, and lateral spiral applications.

Other objects will appear hereinafter.

For the purpose of illustrating the invention, there is shown in the drawings a form which is presently preferred; it being understood, however, that this invention is not limited to the precise arrangements and instrumentalities shown.

Referring to the drawing in detail, wherein like numerals indicate like elements, there is shown in FIG. 1 a conduit covering in accordance with one embodiment of the present invention wherein the covering has been wrapped around a conduit and has a lap joint.

Figure 1:
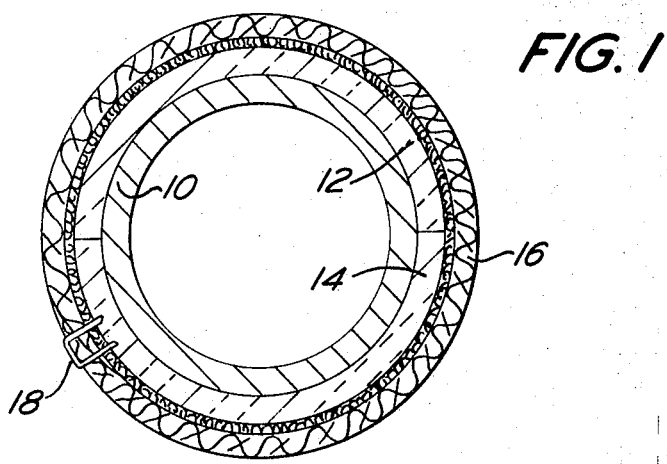
FIG. 1 is a sectional view of a conduit having a covering in accordance with the present invention wherein the covering has a longitudinal lap joint.

In FIG. 1, the conduit 10, made of metal, is adapted to contain therewithin a high temperature fluid such as steam. If desired, the conduit 10 may be encased between semicircular strips of insulation material 12 and 14. The strips of insulation material 12 and 14 are encased by the covering 16. The longitudinally extending side edges of the covering 16 overlap one another and are secured to the insulation material 14 in any convenient manner such as adhesives, an outside wiring mechanism, or as by staple 18.

The covering 16 is stretchable and workable in at least one direction, and is pervious to water and other liquids. The covering 16 is knitted from an organic material such as permanent fire-retardant rayon and has a loop pile, preferably on the inner surface thereof. For special texturing and sound absorbing properties the loop pile may be disposed on the outer surface. The covering 16 has between 6 and 20 wales per inch and a weight of between 8 and 40 ounces per square yard. The covering 16 is free from any anti-curl finish or other finish which releases substantial amounts of toxic gases except for CO or $CO_2$ when subjected to heat. Covering 16, for example, may be knit from fibers made in accordance with the aforementioned U.S. Pat. No. 3,455,713 wherein the cellulose filaments have dispersed therein a water-insoluble liquid phosphonitrilate polymer. Thus, the flame-retardant properties are not a surface finish, but rather, the result of compounding the components of the filaments from which the fabric is knitted.

Figure 2:
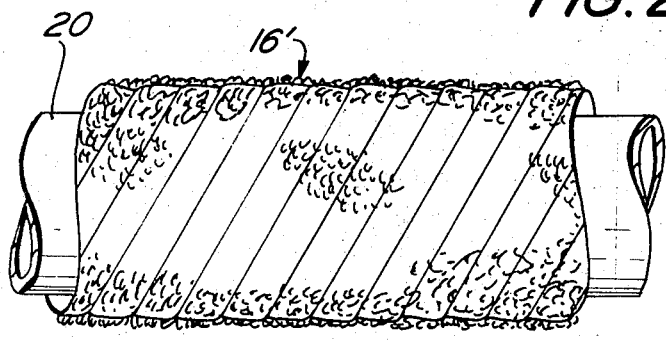
FIG. 2 is a side elevation view of a conduit having a covering in accordance with the present invention applied by helically winding the covering around the conduit.

In FIG. 2, the conduit 20 is provided with a covering 16' attained by helically winding the cover 16 around the conduit with one longitudinally extending side edge partially overlapping the adjacent portion of the strip of knitted fabric. Thus, FIG. 2 illustrates another embodiment of the present invention wherein the conduit is provided with a covering made from the knitted organic material of the present invention having loop pile on the exposed surface thereof as described above to provide special texturing and sound absorbing properties.

In FIG. 1, the covering 16 mechanically holds the rigid insulation material 12, 14 in place around the conduit 10. In FIG. 2, the covering 16' helically wrapped around the conduit 20 is a thinner layer since there is no insulation material between the covering 16' and the conduit 20.

Figure 3:
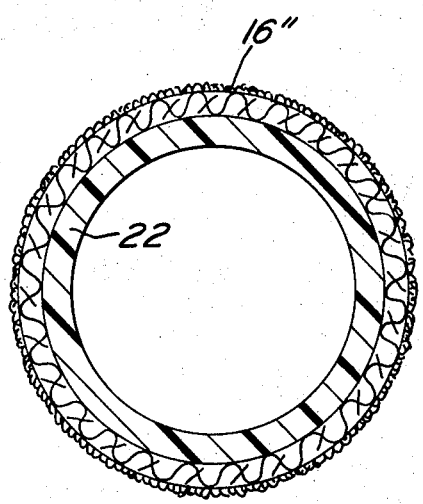
FIG. 3 is a sectional view of a conduit having a covering in accordance with the present invention wherein the covering is a seamless knitted cylinder.

In FIG. 3, there is illustrated a plastic conduit 22 having a covering 16" in accordance with the present invention. The covering 16" is a seamless cylinder stretched over the conduit 22 and made in accordance with the above description. Thus, it will be noted that the covering of the present invention may be utilized in conjunction with conduits which contain therewithin high temperature fluids such as steam or may be utilized as a covering for plastic conduits which will be subjected to a high temperature environment while transmitting therewithin a relatively low temperature fluid such as water or oil having a temperature between 75° and 150°F. Any one of the coverings 16, 16', or 16" may be washed or dry cleaned in situ with materials as described above.

When heated to a cherry red color by means of a blow torch, and then permitted to cool to room temperature, the conduit covering of the present invention does not harden and become brittle but rather retains its soft flexible and stretchable qualities, although it will char. Hence, even though the conduit covering is of a knitted fabric, it need not be replaced if the environment of the conduit is subjected to flames. As referred to heretofore, the covering of the present invention is a knitted material. Attempts to attain a non-asbestos covering having the aforementioned properties and made by weaving have been unsuccessful.

While I do not wish to be bound by any theory, it is my belief that the properties of the covering of the present invention are achieved due to the high number of air cells per unit weight in the knit covering of my invention. If desired, the exposed surface of the covering may be aluminized to provide a heat reflector. This may be attained by bonding a thin layer of aluminum foil to the loops by application of heat and pressure. The manner in which substrates and fabrics may be provided with aluminized coating is per se well known to those skilled in the art and need not be described herein.

The covering of the present invention may be used as a substrate for other coatings, such as high density elastomers, phenolics, neoprene and the like. The covering possesses desirable heat dissipation and flame retardance properties, and limpness, which render it useful as a substrate.

In the embodiments illustrated in FIGS. 1 and 2, the conduit coverings 16 and 16' are retained around the conduit by a mechanical means. If desired, the covering may be adhesively secured in position around the conduit. If adhesive bonding is desired, the coverings may be impregnated with a rewettable adhesive. Rewettable adhesives are commercially available and their composition is known to those skilled in this art. A suitable example is a finely powdered clay-organic binder mixture, such as an adhesive consisting of 12 weight percent finely divided Montmorillonite clay, 1 weight percent organic binder, and 87 weight percent water. When dry this material is only a coating and not an adhesive. When wet or rewet it functions as an adhesive. Such coverings would be applied around the conduit and then wetted so as to effect the adhesive bond. If desired, even the seamless covering 16" could be adhesively bonded to the outer periphery of conduit 22.

The seamless cylinder used for the covering 16" may have a diameter of between ½ and 24 inches. While any of the coverings 16, 16' and 16" may have a range of 6 to 20 wales per inch, in a preferred embodiment the coverings have 11 to 12 wales per inch. When using a seamless covering such as covering 16", the diameter of the covering is slightly smaller than the diameter of the conduit whereby the covering is stretched over the conduit. The denier of the fibers is between 1 and 4, and preferably 1½ and 3. A suitable length of staple is 1 1/16 inches. Other normal staple lengths may be used.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising a conduit and an absorbent fire-retardant fabric covering surrounding said conduit, said covering being stretchable and workable in at least one direction, said covering including a flexible layer of knitted organic material having loop pile on at least one surface thereof, said material having between 6 and 20 wales per inch and a weight of between 8 and 40 ounces per square yard, means for providing said one surface fire-retardant, said knitted organic material being pervious to water and said knitted organic material being free from any finish which releases substantial amounts of toxic gases other than $CO$ or $CO_2$ when subjected to heat.

2. Apparatus in accordance with claim 1 wherein said covering has a longitudinally extending lap joint.

3. Apparatus in accordance with claim 1 wherein said covering is helically wound around said conduit.

4. Apparatus in accordance with claim 1 including rigid insulation material between said covering and said conduit, said rigid insulation material being held in place by said covering.

5. Apparatus in accordance with claim 1 wherein said covering is a seamless cylinder stretched over said conduit.

6. Apparatus in accordance with claim 1 including an aluminum coating on said one surface, said coating being bonded to said loops.

7. Apparatus in accordance with claim 1 wherein said covering is adhesively bonded to said conduit.

8. Apparatus in accordance with claim 1 wherein said loop pile is on the inner surface of said covering.

9. Apparatus in accordance with claim 1 wherein said material is knitted from filaments which are a fire-retardant material.

* * * * *